Oct. 4, 1938.    J. J. SCHLUMBRECHT    2,132,049
BRAKE SHOE ADJUSTING AND CENTERING DEVICE
Filed July 14, 1937
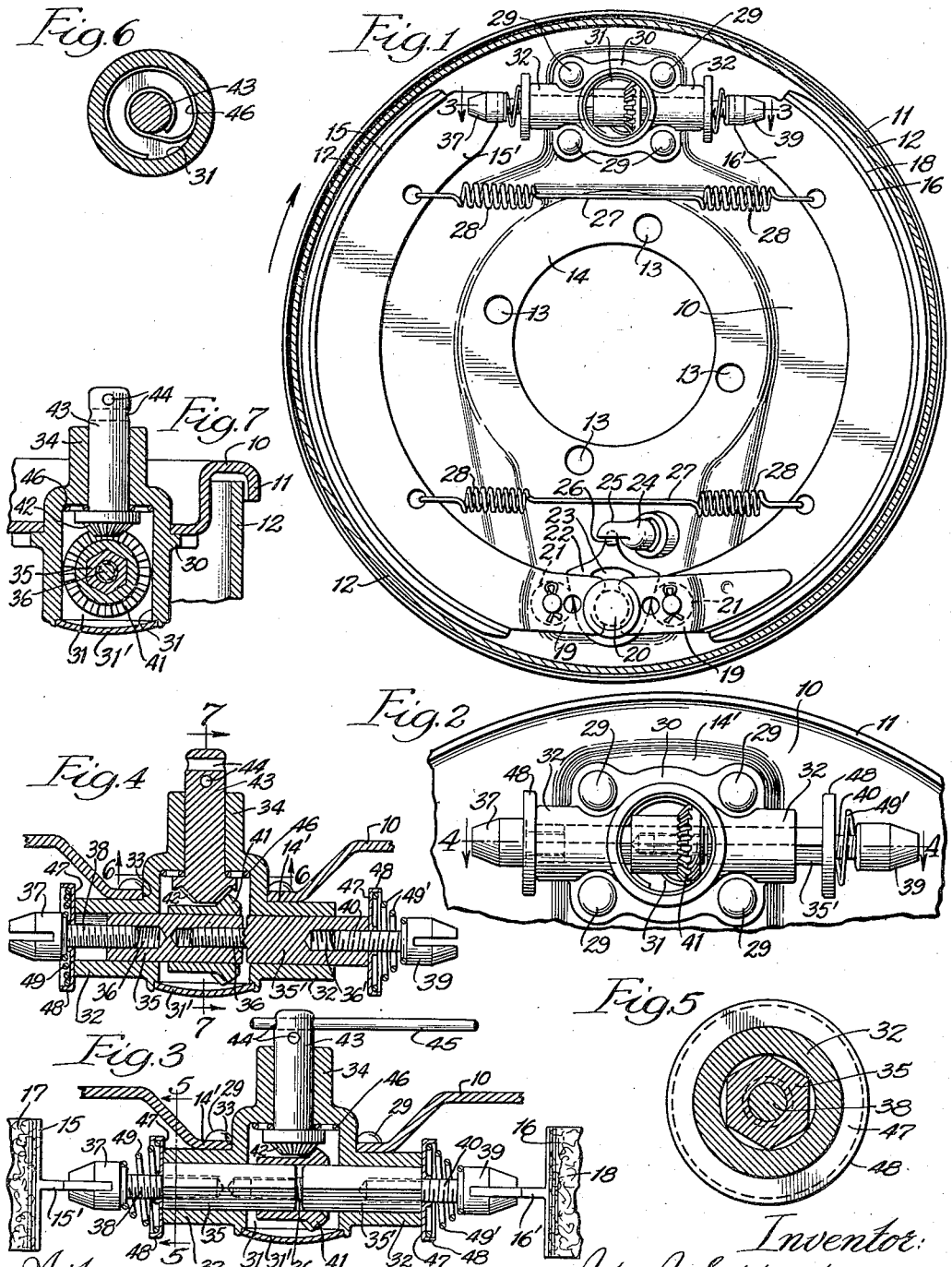

Patented Oct. 4, 1938

2,132,049

UNITED STATES PATENT OFFICE 2,132,049

BRAKE SHOE ADJUSTING AND CENTERING DEVICE

John J. Schlumbrecht, Chicago, Ill.

Application July 14, 1937, Serial No. 153,577

4 Claims. (Cl. 188—79.5)

This invention belongs to the art of vehicle wheel brakes, and more especially brakes of the type extensively used on automobiles where a pair of opposed approximately semi-circular brake shoes are mounted on a metal disc support attached to the front axle or to the rear axle housing or bridge, and are adjustably anchored at one end to the support and at their other ends are expanded into contact with the brake drum on the wheel by mechanical or hydraulic means operated by the driver of the vehicle. The outer surfaces of the shoes are covered with friction brake linings, and as the latter wear down the shoe anchoring means is adjusted to compensate for such wear. A known form of adjustable shoe anchoring means consists of a fixed casing attached to the support and including a tubular bearing member located between opposed ends of the two shoes, a shaft rotatably and slidably mounted in said bearing member and having tapped holes in its ends, longitudinally slotted anchors straddling the webs of the shoes and having oppositely threaded stems engaged with the tapped holes in the ends of said shaft, and gearing in said casing for rotating said shaft operable by a suitable wrench or key from the outer side of the support. Thus, when the shoe linings have been worn down, by rotating the said shaft in the right direction the two anchors are adjusted outwardly to reset the shoes in correct spacing relatively to the drum with which they co-act.

Now, in the operation of a brake of this type when the expander at the other end of the two shoes is operated to apply the brake, the two shoes are forced into contact with the rotating drum, and the drag of the drum on one shoe (known as the primary shoe) urges said shoe toward the anchoring and adjusting device, while the drag of the drum on the other shoe (known as the secondary shoe) urges the latter away from the anchoring and adjusting device. And since nearly all the travel of an automobile is in a forward direction, the drum action on the shoes shifts the slidable shaft that connects the two anchors in a direction toward the secondary shoe so that the latter receives the greater wear.

A further fault (which the present invention is designed to cure) lies in the fact that when the brake is released the shoes do not always re-center themselves relatively to the drum, but sometimes cling to the drum, especially when gravity urges them outwardly, creating wasteful friction and wear and, of course, to the extent of such clinging action, retarding the free rotation of the wheel.

One object of this invention is to provide a brake of the type above described that will eliminate the above noted fault in the behavior of the brake and will insure the automatic re-centering of the brake shoes as soon as the pressure on the brake pedal is released.

Further objects of the invention are to provide an improved construction of the slidable shaft that connects the stems of the two anchors, by which the necessity of machining the tubular bearing member of the shaft to an exact length to prevent lost motion and consequent drag of the shoes on the drum is avoided, and to provide a construction whereby the length of the slidable shaft may be finely adjusted in situ and without the necessity of first removing it from its bearing.

An improved embodiment of the principle of the invention is illustrated in the accompanying drawing, in which—

Fig. 1 is an inner side elevation of a metal disc commonly known as the "dust shield", which is rigidly attached either to the front axle or to the bridge or housing of the rear axle and which covers the open side of the rotating brake drum and supports the brake shoes and shoe-operating and adjusting parts, the figure showing the drum in section and the shoes in release and centered position.

Fig. 2 is a fragmentary view, enlarged, of the upper portion of Fig. 1, showing an exaggerated position of the parts of the shoe adjusting and centering device assumed when the brake is applied with the drum rotating in the direction of the arrow, Fig. 1.

Fig. 3 is an axial plan section on the line 3—3 of Fig. 1.

Fig. 4 is an axial plan section on the line 4—4 of Fig. 2.

Fig. 5 is an enlarged transverse section on the line 5—5 of Fig. 3.

Fig. 6 is a transverse section on the line 6—6 of Fig. 4.

Fig. 7 is a vertical section on the line 7—7 of Fig. 4, including fragments of the supporting disc and drum.

Describing the embodiment of the invention illustrated in the accompanying drawings, 10 designates as an entirety a metal disc constituting the dust shield formed with a peripheral rim 11 which overlaps the open end of the brake drum 12 which latter is attached to the inner face of the wheel. In the instance shown, the disc 10 is rigidly attached to an annular flange on the bridge or housing of the rear axle by bolts passed through holes 13 in a central inwardly offset portion 14 of the disc.

Oppositely disposed within the drum 12 and the dust shield 10 are the two segmental expanding brake shoes 15 and 16 equipped on their outer peripheral surfaces with the usual friction linings 17 and 18 respectively. The lower ends of the shoes 15 and 16 are equipped with forked extensions 19, the inner ends of which are concaved to partially embrace a stud 20 secured in the disc 10, the head of the stud overlapping the inner end portions of the extensions 19. Journaled in the forked extensions 19 are rollers 21, between which lies a wedge-shaped expander 22 having an opening 23 through which the stud 20 passes and large enough to permit a considerable inward and outward movement of the expander. The brake shoes are expanded onto the drum by a rock shaft 24 equipped with an arm 25 overlying the head 26 of the expander. The two brake shoes are normally drawn inwardly by a pair of rods 27, each having incorporated therein stiff coil springs 28, whereby the shoes are normally held just out of contact with the inner periphery of the brake drum.

The parts as thus far described are old and known. Coming now to a description of my present improvements, attached to the upper portion of the disc 10 as by rivets 29 is a casing comprising a base plate 30, a central, transverse cylindrical gear chamber 31, and a pair of axially alined hollow bosses 32 on opposite sides of and interiorly communicating with the central gear chamber 31. As shown in Figs. 3 and 4, the inner end portion of the central gear chamber 31 extends through a hole 33 in an inwardly offset portion 14' of the disc 10 and continuous therewith is a bearing boss 34 disposed at right angles to the bearing bosses 32. The outer open end of the chamber 31 is normally closed by an impressed removable cap 31'.

The bores of the alined bosses 32 are of round cross section and unitedly form a bearing for a shaft that is both slidably and rotatably mounted therein. In the instance shown, this shaft consists of a pair of twin sections 35 and 35' that are of polygonal cross section, as shown in Fig. 5, and are connected by a screw-threaded joint 36, so that by relative turning movement of the two sections the total length of the shaft can be adjusted to exactly equal the total length of the shaft bearing, for a purpose later disclosed. The outer ends of the shaft sections 35 and 35' are formed with oppositely threaded sockets 36 and 36' (Fig. 4). 37 designates one of the anchors having a stem 38 formed with a right hand thread engaged with the socket 36, and 39 designates the other anchor having a stem 40 formed with a left hand thread engaging the socket 36'. The two anchors 37 and 39 are slotted to embrace the upper ends of the webs 15' and 16' of the shoes 15 and 16.

By reference to Figs. 3 and 4 it will be observed that the threads of the anchor stem 40 and its socket 36' are of greater pitch than the threads of the anchor stem 38 and its socket 36, so that, when the shaft 35, 35' is turned, anchor 39 travels outwardly further than does anchor 37, for the purpose above described. This feature may be usefully employed with either the two-piece shaft shown, or with a one-piece shaft, or with a rotary but non-slidable shaft, and either with or without the automatic shoe centering mechanism later described; and another advantage it has is that it obviates the necessity of employing the separate manually operated eccentric adjusting devices now used to secure proper clearance of the shoes from the drum after the adjustment of the anchors has been made.

Slidably mounted on the shaft 35, 35', within the central chamber 31 is the hub of a miter gear 41 that is normally engaged and driven by a miter pinion 42 on the inner end of an operating shaft 43 that is journaled in the bearing boss 34 and is provided on its outer projecting end with transverse holes 44, through which a suitable tool 45 may be inserted for turning the shaft 43. A friction spring 46 (Fig. 6) bearing on the shaft 43 in rear of the pinion 42 and on the surrounding wall of the chamber 31 prevents accidental turning of the shaft 43 under the jars and vibrations to which the mechanism is subjected in use.

Manifestly by turning the operating handle 45 in one direction or the other, the shaft 35, 35' is rotated through the described gearing, and since the anchors 37 and 39 cannot turn, they are advanced or retracted according to the direction of rotation, thus adjusting the brake linings into correct spacing relatively to the brake drum.

With reference to the direction of rotation of the brake drum, as shown by the arrow in Fig. 1, the shoe 15 is known as the primary shoe, and the shoe 16 as the secondary shoe. As the shoes grip the drum, the latter exerts an upward drag on the primary shoe 15 and a downward drag on the secondary shoe 16, which movements tend to shift the shaft 35, 35' from its normal central position as shown in Fig. 3, to an endwise displaced position, to the right, as shown in exaggerated form in Figs. 2 and 4, and this causes the greatest wear on the lining of the secondary shoe 16. Furthermore it not infrequently happens that the shoe 16 "freezes" or clings to and lies against the drum after the brake has been released, thus causing unnecessary friction and back drag on the free movement of the wheel. To prevent this, and insure the automatic re-centering of the brake shoes as soon as the brake is released, I have designed an automatic shoe re-centering device which preferably takes the form illustrated in the drawing and consists of the following:

Slidably mounted on the two threaded stems 38 and 40 of the anchors 37 and 39, are thimbles each comprising a flat portion 47 of greater diameter than the bearing bosses 32 and a rim portion 48. These thimbles seat the wide ends of a pair of conical thrust springs 49 and 49', the opposite or smaller ends of which abut against the inner ends of the anchors 37 and 39 respectively. These springs 49 and 49' are preferably of equal strength.

Describing the operation of these centering springs, the brake shoes are normally in the centered position shown in Fig. 1, in which position the shaft 35, 35' and the thimbles, anchors and springs are in the position shown in Fig. 3. The application of the brake throws these parts toward the position shown in Figs. 2 and 4, in which the spring 49 has been compressed, while the spring 49' undergoes no compression, but is bodily carried outwardly by the shaft section 35'. Now, as soon as the brake is released, the spring 49 reacts to restore the parts to the position shown in Fig. 3 and thus re-centers the shoes relatively to the drum. Where anchors of the forked type straddling but not connected to the webs of the shoes, such as 37 and 39, are used, the centering of the shoes is effected by the thrust of spring 49 transmitted through anchor 37 to shoe 15 and thence through link 27 to the other shoe 16. But where, as is sometimes the case, the anchors are pivotally connected to the upper ends of the shoes and a link such as 27 directly connecting the shoes is not used, the primary shoe is centered by the direct thrust of spring 49 acting through its associated anchor, and the secondary shoe is centered by the impulse of the same spring transmitted through the endwise movable shaft, the anchor stems and the anchors. If the drum is turned in the reverse direction, the movement of these parts is obviously in the opposite direction, the spring 49' undergoing compression and subsequently reacting to restore the parts to normal position.

The shaft bearing is a casting, and is ordinarily applied without any machining. Consequently the shaft bearings of a group of castings may vary slightly in length. In the described construction it is desirable that the thimbles, in the normal or centered position of the parts as shown in Fig. 3, should bear against not only the ends of the bearing but also the ends of the shaft itself. If the shaft is slightly shorter than its bearing, or the bearing is slightly shorter than the shaft, the shoes may lie in either direction against the drum causing drag and wear when the parts are in idle position. This explains the purpose of the construction of the shaft in two sections connected by a threaded joint. By merely giving one section as little as one-sixth of a turn (when employing a hexagonal shaft), the shaft to that extent can become shortened or lengthened; and this can be done with the shaft in situ, by merely disconnecting the shoe from its associated anchor, shifting the shaft to the position shown in Fig. 4 wherein the shaft section 35' is clear of the hub of the gear 41, and then turning the shaft section 35' to effect the desired lengthening or shortening to make the shaft of equal length with its bearing.

Changes and variations in the structural details may be resorted to without departing from the spirit and substance of the invention as defined in the following claims.

I claim:

1. The combination with a brake drum, a support therein, a pair of opposed brake shoes arranged for internal action in said drum, and means for expanding the shoes onto the drum, of means for centering the shoes relatively to the drum, comprising a fixed bearing attached to said support, a member mounted to slide endwise in said bearing, anchors engaged with the opposed ends of said shoes and having stems mounted in the ends of said slidable member, thimbles slidably mounted on said stems and adapted to abut against the ends of said bearing, and springs confined under compression between said thimbles and anchors; said slidable member being made in two sections connected endwise by a screw-threaded joint, whereby said slidable member may be adjusted to the exact length of said bearing, and said thimbles may abut against the ends of both the bearing and the slidable member.

2. The combination with a brake drum, a support therein, a pair of opposed brake shoes arranged for internal action in said drum, and means for expanding the shoes onto the drum, of means for compensating for wear and for centering the shoes relatively to the drum, comprising a fixed bearing attached to said support, a shaft of polygonal cross-section rotatably and slidably mounted in said bearing, said shaft being made in two sections connected endwise by a screw-threaded joint whereby said shaft may be adjusted to the exact length of said bearing, anchors non-rotatably engaged with the opposed ends of said shoes and having oppositely threaded stems engaged with the ends of said shaft, means for turning said shaft to adjust said anchors outwardly or inwardly, said last named means including a gear having a hub fitting and relatively slidable on said shaft and confined against endwise movement, thimbles slidably mounted on said stems and adapted to abut against the ends of said bearing and shaft, and thrust springs encircling said stems and confined endwise under compression between said thimbles and anchors.

3. A specific embodiment of claim 2, wherein, by disconnecting one shoe from its associated anchor, the shaft may be moved lengthwise in its bearing sufficiently to shift one section thereof out of the gear hub and thus permit adjustment of the length of the shaft without removing the latter from its bearing.

4. A specific embodiment of claim 2, wherein, in the assembled position of the parts, the gear hub overlaps the meeting ends of the two shaft sections, thereby turning both sections equally and simultaneously and locking both sections against turning relatively to each other.

JOHN J. SCHLUMBRECHT.